(12) United States Patent
Miller et al.

(10) Patent No.: US 6,532,555 B1
(45) Date of Patent: Mar. 11, 2003

(54) METHOD AND APPARATUS FOR INTEGRATION OF REAL-TIME TOOL DATA AND IN-LINE METROLOGY FOR FAULT DETECTION IN AN ADVANCED PROCESS CONTROL (APC) FRAMEWORK

(75) Inventors: Michael Lee Miller, Cedar Park, TX (US); Qingsu Wang, Austin, TX (US); Elfido Coss, Jr., Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 09/430,475

(22) Filed: Oct. 29, 1999

(51) Int. Cl.$^7$ ................................................ G06F 11/00
(52) U.S. Cl. ......................... 714/48; 700/109; 700/108
(58) Field of Search ........................... 714/48; 700/108, 700/109, 110, 121

(56) References Cited

U.S. PATENT DOCUMENTS

| | | | | |
|---|---|---|---|---|
| 5,105,362 A | * | 4/1992 | Kotani ........................ 700/108 |
| 5,787,190 A | | 7/1998 | Peng et al. .................. 382/145 |
| 5,859,964 A | | 1/1999 | Wang et al. ............ 395/185.01 |
| 5,864,773 A | | 1/1999 | Barna et al. ................... 702/85 |
| 5,896,294 A | | 4/1999 | Chow et al. ........... 364/468.28 |
| 5,939,886 A | | 8/1999 | Turner et al. ................ 324/464 |
| 5,963,884 A | | 10/1999 | Billington et al. ............. 702/56 |
| 6,061,640 A | * | 5/2000 | Tanaka et al. ............... 700/108 |
| 6,065,128 A | | 5/2000 | Harvey ........................ 713/500 |
| 6,070,196 A | | 5/2000 | Mullen, Jr. .................. 709/250 |
| 6,097,887 A | | 8/2000 | Hardikar et al. ............. 395/701 |
| 6,115,643 A | * | 9/2000 | Stine et al. .................. 700/108 |
| 6,130,414 A | | 10/2000 | Toprac ........................ 219/497 |
| 6,263,255 B1 | | 7/2001 | Tan et al. .................... 700/121 |
| 6,314,328 B1 | * | 11/2001 | Powell ........................ 700/109 |
| 6,314,385 B1 | * | 11/2001 | Kim et al. ................... 700/108 |
| 6,336,055 B1 | * | 1/2002 | Cho ............................ 700/109 |
| 2002/0062162 A1 | * | 5/2002 | Bunkofske et al. ......... 700/108 |

* cited by examiner

Primary Examiner—Robert Beausoliel
Assistant Examiner—Marc Duncan
(74) Attorney, Agent, or Firm—Williams, Morgan & Amerson (57) ABSTRACT

A method and apparatus for providing near real-time fault detection in a manufacturing process is provided. The apparatus includes a processing tool adapted to manufacture a processing piece and an interface, coupled to the processing tool, for receiving operational data from the processing tool related to the manufacture of the processing piece, and product data defining characteristics of the processing piece. In one embodiment, the processing tool is in the form of semiconductor fabrication equipment and the processing piece is a silicon wafer. A fault detection unit is provided to determine if a fault condition exists with the processing tool from the operational data or with the processing piece from the product data. An Advanced Process Control (APC) framework is further provided to receive the operational and product data from the first interface, and to send the data to the fault detection unit.

21 Claims, 5 Drawing Sheets

METHOD AND APPARATUS FOR INTEGRATION OF REAL-TIME TOOL DATA AND IN-LINE METROLOGY FOR FAULT DETECTION IN AN ADVANCED PROCESS CONTROL (APC) FRAMEWORK

BACKGROUND OF THE INVENTION

1. Field of the Invention

This invention relates generally to semiconductor fabrication technology, and, more particularly, to a method and apparatus for integrating real-time tool data and in-line metrology for fault detection in an Advanced Process Control (APC) framework.

2. Description of the Related Art

There is a constant drive in the semiconductor industry to increase the quality, reliability, and throughput of integrated circuit devices such as microprocessors, memory devices and the like. This drive is fueled by consumer demands for higher quality computers and electronic devices that operate more reliably.

These demands by the consumer have resulted in some improvements in the manufacture of semiconductor devices as well as in the manufacture of integrated circuit devices incorporating such semiconductor devices. Reducing defects in the manufacture of these devices lowers the cost of the devices themselves. Accordingly, the cost of the final product incorporating these devices is also reduced, thus providing inherent monetary benefits to both the consumer and manufacturer.

Although there has been an improvement in detecting faults associated with semiconductor manufacturing processes, one problem currently encountered by the semiconductor manufacturing industry is the delay in reporting these faults such that corrective measures can be implemented in a more expedient manner. As a result of this delay, several faulty devices are produced, which undesirably increases costs for the manufacturer and consumer.

The present invention is directed to overcoming, or at least reducing the effects of, one or more of the problems set forth above.

SUMMARY OF THE INVENTION

In one aspect of the present invention, a method is provided for fault detection in a manufacturing process. The method comprises receiving at a first interface operational data of a processing tool related to the manufacture of a processing piece, and product data defining characteristics of the processing piece. The operational and product data are sent from the first interface to a fault detection unit. The method further includes determining if a fault condition exists with the processing tool based upon the operational data and if a fault condition exists with the processing piece based upon the product data at the fault detection unit.

In another aspect of the present invention, a system is provided for fault detection in a manufacturing process. The system comprises a processing tool adapted to manufacture a processing piece. A first interface, coupled to the processing tool, is adapted to receive operational data from the processing tool related to the manufacture of the processing piece, and to receive product data defining characteristics of the processing piece. A fault detection unit is provided to determine if a fault condition exists with the processing tool and the processing piece. The system further includes a framework adapted to receive the operational and product data from the first interface, and to send the data to the fault detection.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
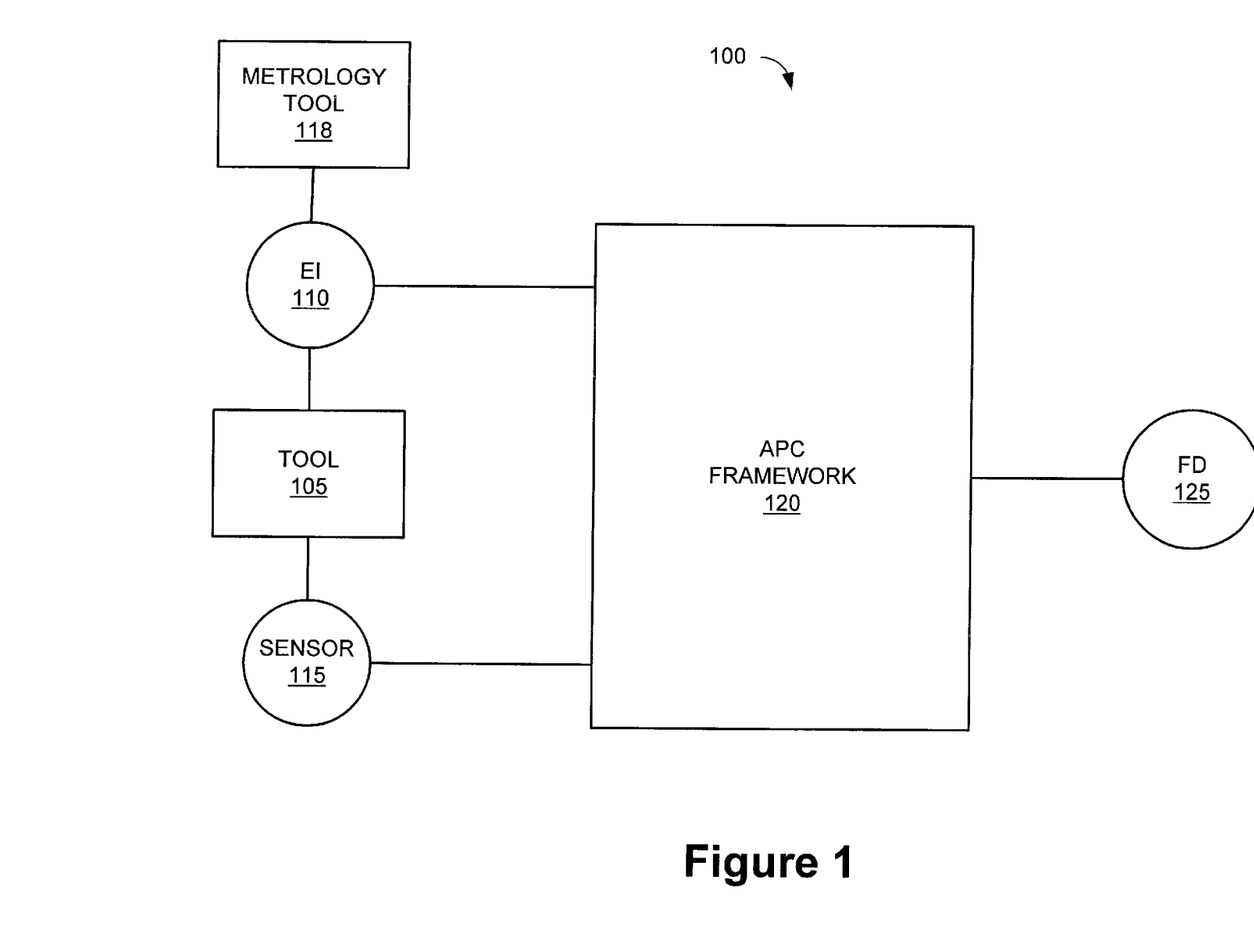
FIG. 1 illustrates a manufacturing system, including an APC framework, for providing fault detection of a processing tool and a processing piece, in accordance with one embodiment.

Turning now to the drawings, and specifically referring to FIG. 1, a system 100 for integrating real-time tool data and in-line metrology for fault detection in a semiconductor fabrication process is provided. The system 100 includes a processing tool 105, which in the illustrated embodiment, is in the form of semiconductor fabrication equipment used to produce a processing piece, such as a silicon wafer, for example. The processing tool 105, in accordance with one embodiment, may be an exposure tool, commonly known as a "stepper." It will be appreciated, however, that the processing tool 105 need not necessarily be limited to a stepper, or even to a tool for producing silicon wafers, but could include other types of manufacturing equipment for producing a variety of different types of commercial products without departing from the spirit and scope of the present invention.

The processing tool 105 is coupled to an equipment interface (EI) 110, which retrieves various tool operational data from the tool 105, and communicates this data to an Advanced Process Control (APC) framework 120 to determine whether the tool 105 is experiencing a faulty operation. The tool operational data may include, but is not necessarily limited to, temperature, pressure, and gas flow measurements from the processing tool 105. The equipment interface 110 further may receive signals from the APC framework 120 that may be used to take corrective action if the tool operational data indicates a faulty operation of the tool 105.

An add-on sensor 115 may also be coupled to the processing tool 105 to measure additional tool operational data that is not ascertained by the tool 105 itself. For example, the add-on sensor 115 could be used to determine whether the silicon wafer was produced within acceptable operational limits by the tool 105. Such acceptable operational limits of the tool 105 may be to produce the wafer within a certain temperature range, for example. It will be appreciated, however, that the add-on sensor 115 may be used to record various other operational parameters, and, thus, need not be limited to the aforementioned example.

The sensor 115 may be embodied as a simple data acquisition program, such as a C++ standalone program acquiring data from a thermocouple wire, for example. Alternatively, the sensor 115 may be embodied as a full-fledged LABVIEW® application, acquiring data through multiple transducers (not shown). It will further be appreciated that the sensor 115 need not be used at all, and the APC framework 120 could rely solely upon the tool operational data forwarded from the equipment interface 110. If used, however, the sensor 115 forwards the additional tool operational data to the APC framework 120 for analysis.

In addition to the tool operational data, wafer product data is obtained from a metrology tool 118 that is also coupled to, the equipment interface 110. The wafer product data is generated from specific quantitative and qualitative measurements that are taken from the wafer by the metrology tool 118. For example, the wafer product data may include film thickness measurements, line width measurements, and/or overlay offset measurements. It will be appreciated that these specific measurements are merely exemplary. Thus, other measurements that describe the quantitative or qualitative characteristics of the wafer may also be taken to determine whether the wafers being produced are defective or do not possess the quantitative or qualitative characteristics desired. As opposed to the tool operational data, the wafer product data provides information about the changing characteristics of the wafer product itself, whereas the tool operational data provides information about the processing conditions involved with manufacturing the wafer product. The manner in which the tool operational data and wafer product data is obtained is well known to those of ordinary skill in the art.

The tool operational data and wafer product data is received by the equipment interface 110 as the data is sent from the processing tool 105 and the sensor 115, if used. The equipment interface 110, subsequent to receiving the data, forwards the tool operational data and wafer product data together to the APC framework 120 for fault detection analysis.

A fault detection (FD) unit 125, which couples to the APC framework 120, receives the operational data of the tool 105 from the equipment interface 110 and sensor 115 via the framework 120. The wafer product data is also received at the fault detection unit 125 along with the tool operational data from the equipment interface 110. Prior to sending the data to the fault detection unit 125, the APC framework 120 translates the tool operational data and the wafer product data to a format that is recognizable to the fault detection unit 125 in a manner that is well known to those of ordinary skill in the art. In accordance with one embodiment, the fault detection unit 125 includes a commercially available software package, such as ModelWare®, for example, that provides fault detection analysis of the processing tool 105. It will be appreciated, however, that other types of commercially available fault detection software could also be used in lieu thereof without departing from the spirit and scope of the present invention.

The fault detection unit 125 compares the received tool operational data from the APC framework 120 to fault model data. The fault model data includes tool operational data of other similar-type tools, where it was previously known that such tools have operated within acceptable operational limits. The types of faults that could be detected by the fault detection unit 125 include processing and/or operational faults in silicon wafer fabrication. Examples of processing faults may include, but are not necessarily limited to, non-optimal preheating of the chamber caused by first wafer effects, catastrophic failure where a broken wafer is detected, abnormal N2 flow rate, temperature overshoots at the top of a ramp, tube temperature measurement drifts, etc. Some examples of operational faults detected by the fault detection unit 125 may include interrupted/resumed processing, no wafer sleuth or improper wafer sleuth prior to Rapid Thermal Anneal (RTA), etc. Similarly, the fault detection unit 125 further compares the received wafer product data from a lot of wafers to previous wafer product data from wafers that were produced having acceptable qualitative and quantitative characteristics.

The fault detection unit 125, upon evaluating the tool operational data and wafer product data sent from the APC framework 120, sends the results of potential faults and/or proper operation of the tool 105, as well as wafer product defects, to the APC framework 120. The APC framework 120, in turn, may send control signals to the equipment interface 110 to control the processing tool 105 based upon the results forwarded from the fault detection unit 125. For example, the signal sent from the APC framework 120 may be to shut down the tool 105 to prevent any additional faulty production of wafers (providing this was determined by the fault detection unit 125). Data could also be sent from the APC framework 120 to inform a technician on how to rectify a faulty condition of the tool 105, if so desired.

Figure 2:
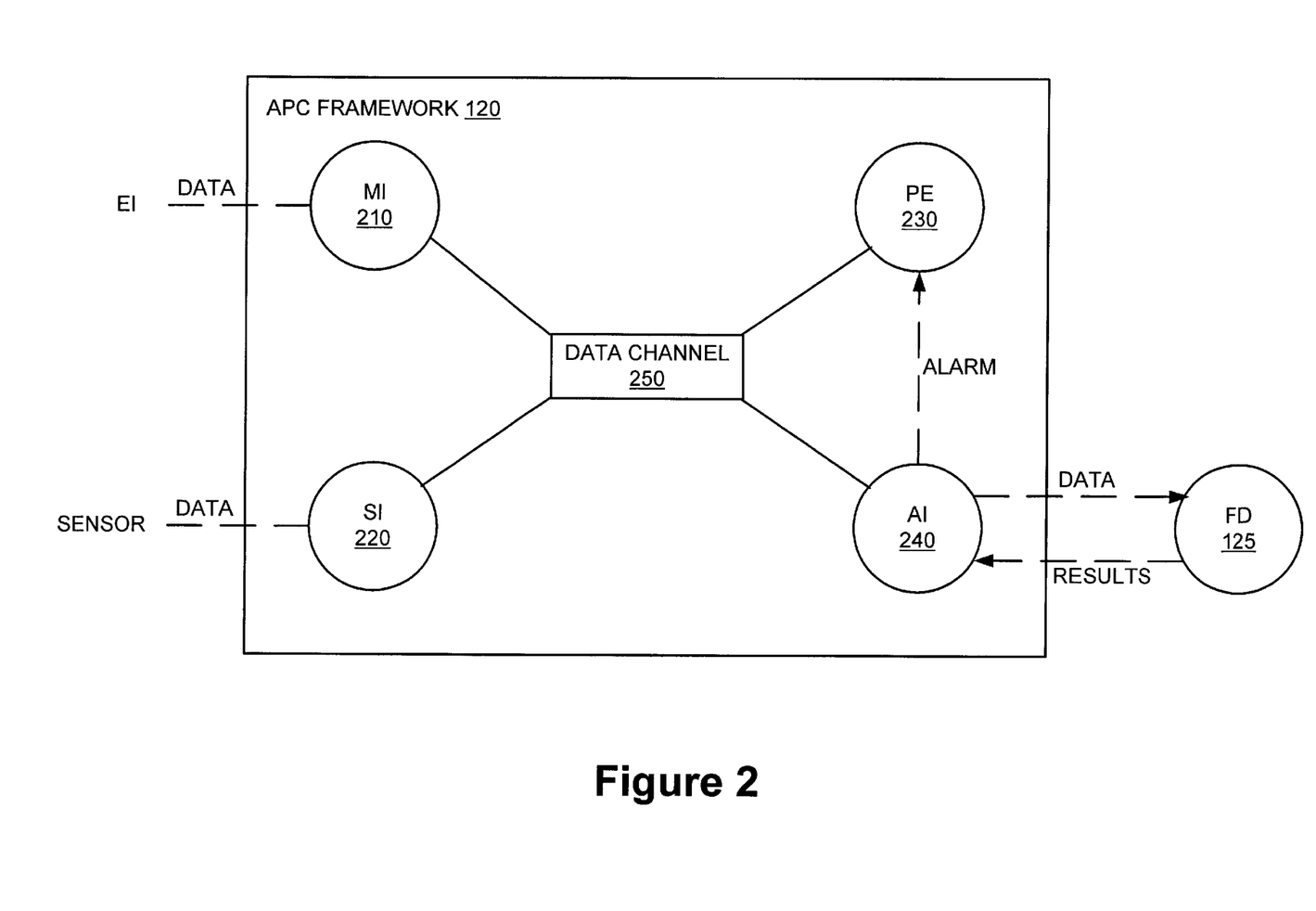
FIG. 2 depicts the detail of the APC framework of FIG. 1.

Turning now to FIG. 2, a more detailed representation of the APC framework 120 is provided. The APC framework 120 is a component-based architecture comprised of interchangeable, standardized software components enabling run-to-run control and fault detection of the processing tool 105. The APC framework 120 includes a machine interface (MI) 210 for interfacing the tool 105 to the framework 120 to collect the tool operational data and wafer product data therefrom. The APC framework 120 further includes a sensor interface (SI) 220 for interfacing the add-on sensor 115 with the framework 120. The sensor interface 220 also collects the tool operational data of the processing tool 105 through the sensor 115. A plan executor (PE) 230 (i.e., a process controller) manages the APC framework 120 and provides possible solutions to problems found with the tool operational data and wafer product data that was determined by the fault detection unit 125. The framework 120 further includes an applications interface (AI) 240 for interfacing with third-party applications that run on the fault detection unit 125 to analyze the tool operational and wafer product data received via the machine and sensor interfaces 210, 220. In the illustrated embodiment, the third-party application is the fault detection unit 125. A data channel 250 is further provided to allow for communication between the machine and sensor interfaces 210, 220, the plan executor 230, and the applications interface 240 of the APC framework 120.

The machine interface 210 couples to the equipment interface 110 to serve as an interface between the processing tool 105 and the APC framework 120. The machine interface 210 supports the setup, activation, monitoring, and data collection of the tool 105. It receives commands, status events, and collected data from the equipment interface 110 and forwards this information to other components of the APC framework 120, namely the plan executor 230 and applications interface 240. Any responses that are received by the machine interface 210 from the other components of the APC framework 120 are routed to the equipment interface 110 for delivery to the processing tool 105. As previously discussed, this may include a signal from the plan executor 230 to manipulate the tool 105 if a faulty condition is detected.

The machine interface 210 also reformats and restructures the messages between the specific communications protocol utilized by the equipment interface 110 and the Common Object Request Broker Architecture Interface Definition Language (CORBA IDL) communications protocol used by the components of the APC framework 120. The manner in which the machine interface 210 performs such translation between the equipment interface-specific communications protocol and the CORBA IDL protocol of the APC framework 120 is well known to those of ordinary skill in the art. Accordingly, the specific translation process between these two formats will not be discussed herein to avoid unnecessarily obscuring the present invention.

The sensor interface 220 serves as an interface between the add-on sensor 115 and the APC framework 120. The sensor interface 220 provides setup, activation, monitoring, and data collection for the add-on sensor 115. Similar to the machine interface 210, the sensor interface 220 also reformats and restructures the messages between the specific communications protocol utilized by the sensor 115 and the CORBA IDL protocol used by the components of the APC framework 120.

The applications interface 240 supports the integration of third-party tools (e.g., commercial software packages, such as ModelWare, MatLab, Matrix-X, and Mathematica, for example) to the APC framework 120. Typically, these third-party tools do not provide the standard CORBA IDL protocol known to the APC framework 120. Accordingly, the applications interface 240 provides the necessary translation between the communications protocol utilized by the third-party tool and the CORBA protocol used by the APC framework 120.

In the illustrated embodiment, the third-party tool is the fault detection unit 125 for analyzing the tool operational data of the processing tool 105 and wafer product data that is supplied via the machine interface 210 and the sensor interface 220. In one embodiment, the fault detection unit 125 includes ModelWare® software for providing fault detection; however, it will be appreciated that other commercially available fault detection software could also be used without departing from the spirit and scope of the present invention.

The plan executor 230 performs control functions based upon the results determined by the fault detection unit 125. When the applications interface 240 receives the results from the fault detection unit 125, it forwards a copy of the results (usually in the form of an alarm signal) to the plan executor 230. Upon inspection of the results, the plan executor 230 attempts to rectify any fault conditions found with the tool 105 or the wafer. The solution to a fault condition may be for the plan executor 230 to send a control signal to the machine interface 210 to shut down the tool 105 so as to prevent further manufacturing of faulty silicon wafers. The plan executor 230, in addition to shutting down the tool 105, may also apprise a technician of any potential solutions to rectify the fault condition through an operator interface (not shown), for example. In accordance with the present invention, the equipment interface 110 receives the tool operational data from the processing tool 105 and the wafer product data from the metrology tool 118, and then forwards this data to the machine interface 210. The sensor 115 also receives tool operational data and forwards the data to the sensor interface 220. The machine interface 210, after receiving the tool operational and wafer product data, forwards the data to the plan executor 230 through the data channel 250. The sensor interface 220 also sends the tool operational data it receives to the plan executor 230. The plan executor 230 then buffers the received tool operational and wafer product data until the occurrence of a predetermined event. The predetermined event, in accordance with one embodiment, may include the completion of processing of a lot (or batch) of wafers by the tool 105, for example. It will be appreciated, however, that the predetermined event need not be limited to this particular example, but could include the occurrence of other events as well. When the batch is complete, the plan executor 230 sends the accumulated tool operational data of the processing tool 105 and the wafer product data to the applications interface 240, which then sends the data to the fault detection unit 125.

The fault detection unit 125 subsequently analyzes the received data by comparing the tool operational data of the processing tool 105 to a fault model, which contains tool operational data from tools that have operated within acceptable limits. Additionally, the fault detection unit 125 also compares the wafer product data to previous wafer product data having acceptable quantitative and qualitative wafer characteristics. Subsequent to comparing the data and detecting any fault conditions that may exist in the manufacturing process and/or wafer product defects, the fault detection unit 125 sends the results back to the applications interface 240, which then forwards the results to the plan executor 230 for appropriate action.

Figure 3A:
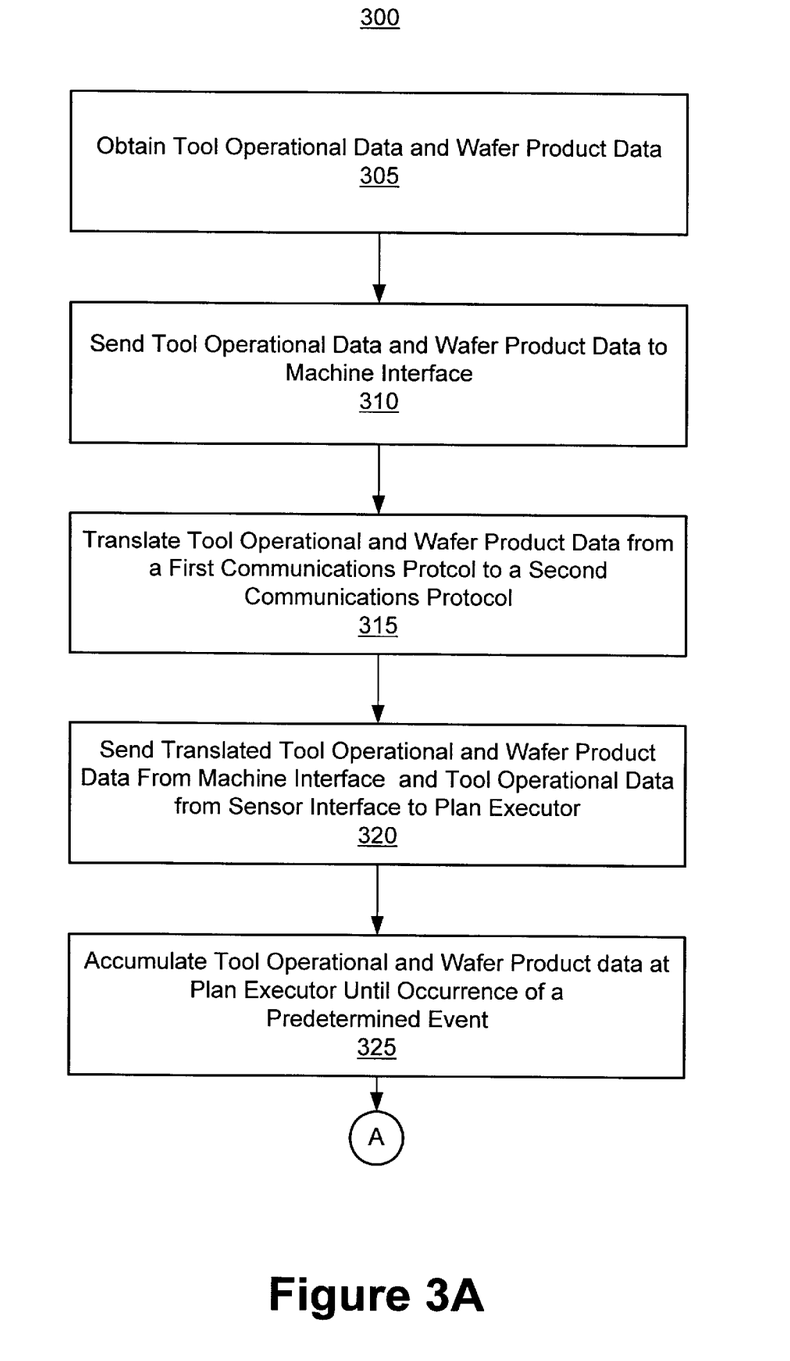
FIGS. 3A–C show a process for providing fault detection capability for the manufacturing system of FIG. 1.
Figure 3B:
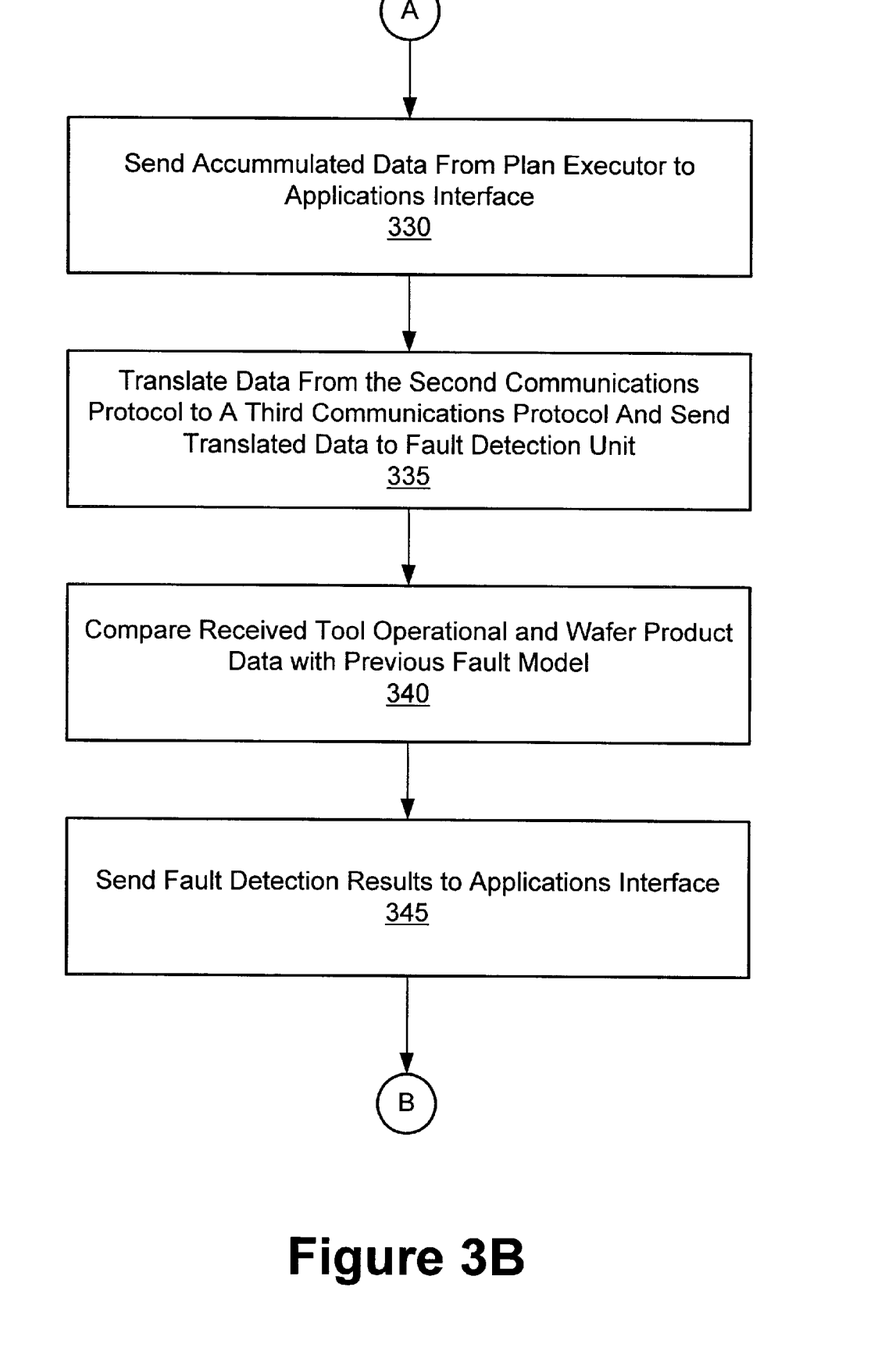
Figure 3C:
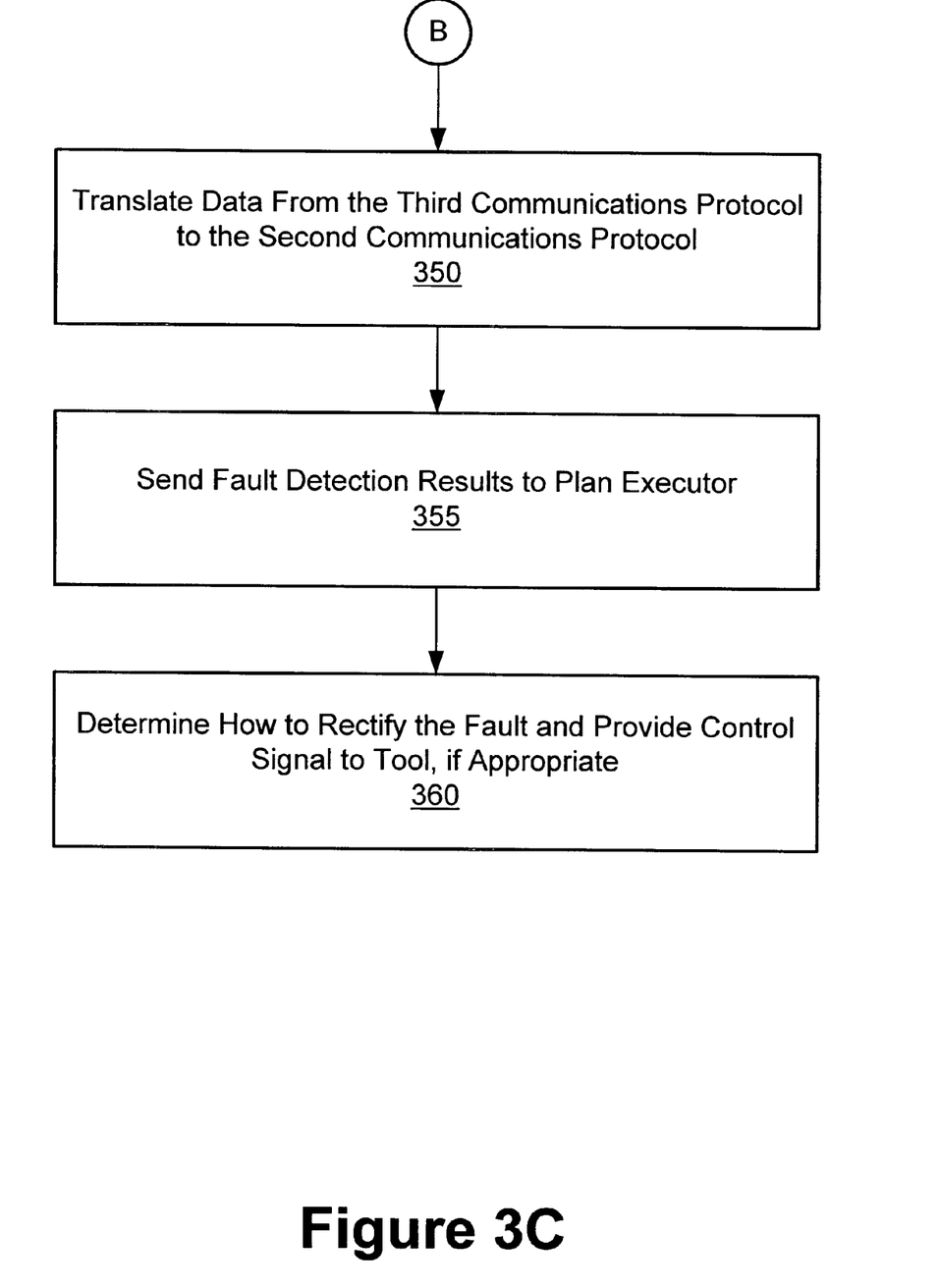

Turning now to FIG. 3, a process 300 for the integration of tool operational data and in-line metrology for fault detection in the APC framework 120 is provided. The process commences at block 305, where the tool operational data of the processing tool 105 and the product data of the wafer are obtained. The tool operational data may include temperature, pressure, and gas flow measurements from the processing tool 105. The wafer product data may include specific quantitative and/or qualitative measurements of the wafer, such as film thickness measurements, linewidth measurements, and overlay offset measurements, for example.

Once the tool operational and wafer product data is obtained by the equipment interface 110, the data is sent to the machine interface 210 at block 310. The machine interface 210 translates the tool operational and wafer product data into a format that is recognizable to the plan executor 230 and the applications interface 240 of the APC framework 120 in a manner well known to those skilled in the art. In accordance with one embodiment, the translation involves the reformatting and restructuring of the messages between the specific communications protocol used by the equipment interface 110 and the CORBA IDL protocol used by the APC framework 120. The machine interface 210, upon translating the tool operational and wafer product data to the CORBA IDL standard, sends the data to the plan executor 230 at block 320. The sensor interface 220 also translates the tool operational data it receives from the sensor 115 to the CORBA IDL standard, and sends this data to the plan executor 230 at block 320.

The plan executor 230 accumulates the tool operational data from the machine interface 210 and sensor interface 220 and the wafer product data from the machine interface 210 until the occurrence of a predetermined event at block 325. The predetermined event, in accordance with one embodiment, may be the completion of a particular lot of wafers by the processing tool 105. It will be appreciated, however, that the predetermined event need not necessarily be defined by the completion of lot of wafers, but could include other events as well.

The tool operational and wafer product data that is accumulated at the plan executor 230 is sent to the applications interface 240 upon occurrence of the predetermined event at block 330, which in the illustrated embodiment, is the completion of a lot of wafers by the processing tool 105. The applications interface 240 translates the tool operational and wafer product data from the CORBA IDL communications protocol utilized by the APC framework 120 to a protocol used by the fault detection unit 125, and subsequently sends the data to the fault detection unit 125 at block 335. As previously discussed, the manner in which the applications interface 240 translates the data into the proper communications protocol is well known to those of ordinary skill in the art, and will differ depending on the particular type of fault detection software used. The fault detection unit 125, after receiving the tool operational data and wafer product data from the applications interface 240, compares the data to a fault model at block 340. As mentioned, the fault model includes tool operational data from other similar-type tools in which it was previously known that such tools manufactured silicon wafers within acceptable operational limits. Additionally, the wafer product data is also compared to previous wafer product data of wafers that were determined to have adequate quantitative and qualitative wafer product characteristics.

Subsequent to comparing the tool operational data of the tool 105 and wafer product data to their respective fault models, the fault detection unit 125 sends the results of the comparison to the applications interface 240 at block 345. The applications interface 240 then subsequently translates the received results from the fault detection unit 125 into the CORBA IDL protocol used by the APC framework 120 at block 350. The applications interface 240 then forwards the results to the plan executor 230 at block 355, which is typically done in the form of an alarm signal. That is, an alarm signal is generated if a fault in the manufacturing process was determined from the tool operational data or if the wafer product was determined to be defective based upon the wafer product data. The plan executor 230, after receiving the alarm signal from the application interface 240, determines how to rectify the fault condition of the processing tool 105 at block 360 (providing that the tool 105 was actually deemed faulty). Rectifying the fault condition by the plan executor 230 may include a signal being sent to the equipment interface 110 to shut down the tool 105, and to provide instructions to a technician on how to clear the fault, for example. The process in which the fault detection unit 125 determines how to rectify the fault condition is well within the knowledge of one of ordinary skill in the art. Accordingly, such process will not be discussed herein to avoid unnecessarily obscuring the present invention. Additionally, in the case where a wafer product defect was found, the applications interface 240 would send a signal to the plan executor 230 to inform a technician as to the nature of the defective characteristic of the wafer product. Once apprised of the defect, the technician could make appropriate adjustments to the manufacturing process to attempt to remove the defect from subsequently produced wafers.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for providing fault detection in a manufacturing process, comprising:

receiving at a first interface operational data of a processing tool related to the manufacture of a processing piece, and product data defining characteristics of the processing piece;

sending the operational and product data from the first interface to a second interface;

translating the operational and product data at the second interface from a first communications protocol used by the first interface to a second communications protocol used by a controller;

sending the operational and product data from the second interface to the controller;

accumulating the operational and product data at the controller;

sending the accumulated operational and product data from the controller to a fault detection unit upon occurrence of a predetermined event; and determining if a fault condition exists with the processing tool based upon the operational data and if a fault condition exists with the processing piece based upon the product data at the fault detection unit.

2. The method of claim 1, further comprising:

sending an alarm signal indicative of the fault condition to the controller from the fault detection unit providing that a fault condition of the processing tool or processing piece was determined by the fault detection unit.

3. The method of claim 2, further comprising:

performing a predetermined action to rectify the fault condition providing that the alarm signal is received by the controller; and sending a signal by the process controller to the first interface reflective of the predetermined action.

4. The method of claim 1, wherein determining if a fault condition exists, further comprises:

comparing the operational and product data received at the controller to predetermined operational and product data at the fault detection unit.

5. A method for providing fault detection in a manufacturing process, comprising:

receiving at a first interface operational data of a processing tool related to the manufacture of a processing piece, and product data defining characteristics of the processing piece;

sending the operational and product data from the first interface to a controller, the operational and product data being received at a second interface from the first interface prior to sending the operational and product data to the controller;

accumulating the operational and product data at the controller; and sending the accumulated operational and product data from the controller to a fault detection unit upon occurrence of a predetermined event, the operational and product data being received at a third interface from the controller prior to sending the operational and product data to the fault detection unit; and determining if a fault condition exists with the processing tool based upon the operational data and if a fault condition exists with the processing piece based upon the product data at the fault detection unit.

6. The method of claim 5, further comprising:

translating the operational and product data at the third interface from the second communications protocol used by the controller to a third communications protocol used by the fault detection unit.

7. A method for providing fault detection in a manufacturing process, comprising:

receiving at a first interface operational data of a processing tool to the manufacture of a processing piece, and product data defining characteristics of the processing piece;

sending the operational and product data from the first interface to a controller;

receiving additional operational data of the processing tool from a sensor that is coupled to the processing tool at a second interface;

sending the additional operational data to the controller as it is received at the second interface;

accumulating the operational and product data and additional operation data at the controller;

sending the accumulated data from the controller to a fault detection unit upon occurrence of a predetermined event; and determining if a fault condition exists with the processing tool based upon the operational data and if a fault condition exists with the processing piece based upon the product data at the fault detection unit.

8. The method of claim 7, further comprising:

translating the operational data at the fourth interface from a first communications protocol used by the sensor to a second communications protocol used by the controller.

9. A method for providing fault detection in a manufacturing process, comprising:

receiving at a first interface operational data of a processing tool related to the manufacture of a processing piece, and product data defining characteristics of the processing piece;

sending the operational and product data from the first interface to a controller;

accumulating the operational and product data at the controller;

sending the accumulated operational and product data from the controller to a fault detection unit upon completion of a lot of processing pieces processed by the tool; and determining if a fault condition exists with the processing tool based upon the operational data and if a fault condition exists with the processing piece based upon the product data at the fault detection unit.

10. A system for providing fault detection in a manufacturing process, comprising:

a processing tool adapted to manufacture a processing piece;

a first interface, coupled to the processing tool, the first interface adapted to receive operational data of the processing tool related to the manufacture of the processing piece, and to receive product data defining characteristics of the processing piece;

a fault detection unit adapted to determine if a fault condition exists with the processing tool and the processing piece; and a framework adapted to receive the operational and product data from the first interface, and to send the data to the fault detection unit;

wherein the framework includes:

a controller adapted to receive and accumulate the operational and product data as the data is received by the first interface, and to send the operational and product data to the fault detection unit upon occurrence of a predetermined event; and a second interface, coupled between the first interface and the controller, the second interface adapted to receive the operational and product data from the first interface, and to translate the operational and product data between a first communications protocol used by the first interface and a second communications protocol used by the framework.

11. The system of claim 10, wherein the second interface is further adapted to send the translated operational and product data to the controller.

12. The system of claim 10, wherein the framework further includes:

a third interface, coupled between the controller and the fault detection unit, and adapted to receive the operational and product data from the controller prior to sending the data to the fault detection unit.

13. The system of claim 12, wherein the third interface is further adapted to translate the operational and product data from the second communications protocol used by the framework to a third communications protocol used by the fault detection unit.

14. The system of claim 13, wherein the framework is an Advanced Process Control (APC) framework, and the second communications protocol used by the framework is a Common Object Request Broker Architecture Interface Definition Language (CORBA IDL).

15. The system of claim 12, wherein the third interface is further adapted to send an alarm signal to the controller providing that a fault condition was determined by the fault detection unit.

16. The system of claim 15, wherein the controller is further adapted to perform a predetermined action to rectify the fault condition providing that the alarm signal is received, and to send a control signal to the first interface reflective of the predetermined action.

17. The system of claim 10, wherein the fault detection unit is further adapted to compare the operational and product data of the processing tool and processing piece to predetermined operational and product data to determine the presence of the fault condition.

18. The system of claim 10, wherein the processing tool is a semiconductor fabrication tool, and the processing piece is a silicon wafer.

19. A system for providing fault detection in a manufacturing process, comprising:

a processing tool adapted to manufacture a processing piece;

a first interface, coupled to the processing tool, the first interface adapted to receive operational data of the processing tool related to the manufacture of the processing piece, and to receive product data defining characteristics of the processing piece;

a fault detection unit adapted to determine if a fault condition exists with the processing tool and the processing piece;

a framework adapted to receive the operational and product data from the first interface, and to send the data to the fault detection unit; and a sensor coupled to the processing tool, the sensor adapted to receive additional operational data from the processing tool; and wherein the framework includes:

a controller adapted to receive and accumulate the operational and product data as the data is received by the first interface, and to send the operational and product data to the fault detection unit upon occurrence of a predetermined event; and     a second interface, coupled between the sensor and the controller, the second interface adapted to receive the additional operational data from the sensor, and to translate the additional operational data between a first communications protocol used by the sensor and a second communications protocol used by the framework.

20. A system for providing fault detection in a manufacturing process, comprising:

a processing tool adapted to manufacture a processing piece;

a first interface, coupled to the processing tool, the first interface adapted to receive operational data of the processing tool related to the manufacture of the processing piece, and to receive product data defining characteristics of the processing piece;

a fault detection unit adapted to determine if a fault condition exists with the processing tool and the processing piece; and an advanced process control (APC) framework adapted to receive the operational and product data from the first interface, and to send the data to the fault detection unit.

21. A system for providing fault detection in a manufacturing process, comprising:

a processing tool adapted to manufacture a processing piece;

a first interface, coupled to the processing tool, the first interface adapted to receive operational data of the processing tool related to the manufacture of the processing piece, and to receive product data defining characteristics of the processing piece;

a fault detection unit adapted to determine if a fault condition exists with the processing tool and the processing piece; and a framework adapted to receive the operational and product data from the first interface, and to send the data to the fault detection unit;

wherein the framework includes:

a controller adapted to receive and accumulate the operational and product data as the data is received by the first interface, and to send the operational and product data to the fault detection unit upon occurrence of a predetermined event; and     wherein the predetermined event is the completion of a lot of processing pieces processed the processing tool.

\* \* \* \* \*